Jan. 22, 1957 R. S. CARUTHERS 2,778,877

FREQUENCY CORRECTING METHOD AND APPARATUS

Filed May 29, 1953 2 Sheets-Sheet 1

INVENTOR.
Robert S. Caruthers
BY Lippincott & Smith
ATTORNEYS

INVENTOR.
Robert S. Caruthers
BY Lippincott & Smith
ATTORNEYS 2,778,877

FREQUENCY CORRECTING METHOD AND APPARATUS

Robert S. Caruthers, Palo Alto, Calif., assignor to Lenkurt Electric Co., Inc., San Carlos, Calif., a corporation of Delaware Application May 29, 1953, Serial No. 358,274

15 Claims. (Cl. 179—15)

This invention relates to methods and apparatus for correcting and bringing to exact values signals represented by electrical waves whose frequencies depart from such values by an error of some unknown number (which may be fractional) of cycles per second. The invention relates particularly to carrier telephone or radio communication signals transmitted by the single sideband method wherein no carrier frequency is transmitted.

In developing such signals the message signals (usually, although not necessarily representing speech) are combined with a carrier frequency in a balanced modulator which suppresses, in its output, both the original signals and the carrier frequency, the resultant output being two sidebands, the frequencies in one of which are the sum and in the other the difference between the carrier and the message frequencies. One of the two sidebands is selected by a filter, and the carriers are chosen with respect to a group of such signals so that they form a continuous band of frequencies. In one system such bands of signals are again modulated in the same manner so as to combine in groups, and the process may be repeated to form super groups comprising substantially continuous bands which may be as wide as desired. Thus, in one actual system four voice channels, each having a nominal band four kilocycles in width, combine to give a 16 kc. band, three of these are remodulated to give a 12 channel, 48 kc. band, and two of the latter, plus an intermediate guard band, give a total band width of 100 kc.

The band of the width mentioned is about the limit that can be handled on ordinary cable or open wire lines. It is not the limit to which the process can be carried, however. Coaxial cable or radio transmission can accommodate much wider bands than this. There is one design of a radio system operating on a frequency in the neighborhood of 1000 megacycles wherein the 12 voice-channel groups are stepped up in frequency and remodulated in groups of five to produce 60-channel bands, and these, again, are remodulated and stepped up, again in groups of five, to provide 300 voice channels, single sideband modulated upon a single radio carrier wave.

To receive such wide band, multichannel groups of signals the process is repeated in reverse order, first the super groups and then the groups and subgroups being demodulated by the addition to or subtraction from waves of the same frequencies which were originally used for the modulations. In stepping up the frequencies for transmission the message frequencies may be added to or subtracted from the successive carrier frequencies. In stepping the frequency down the process is always subtractive but the demodulating carrier may be subtracted from the message signals or vice versa, depending, in general, on whether the upper or the lower sideband was selected in the stepping-up process.

The accurate restoration of the original voice frequencies depends, when this signal sideband system is used, upon the employment, in each demodulation process, of exactly the same carrier or heterodyning frequency as was used in the modulation. The higher the frequency to which the signals have been transposed the more difficult this process becomes. In stepping the frequency up the carrier frequency always appears additively in the modulation products, although lower-order carriers may appear subtractively in the later modulations. When the frequency is stepped down the same nominal carrier frequencies are effectively subtracted. Any discrepancies between the modulating and the demodulating carriers therefore appears as an algebraically added error in the final voice frequency channel.

Oscillator stability is a matter of percentage of the oscillator frequency. A fairly good oscillator may be accurate to one part in 100,000. With greater refinements, accurate temperature control, and other expensive precautions, accuracies of 1 in $10^6$ or $10^7$ can be attained and where ultimate precautions are taken even higher accuracies can sometimes be achieved. In the radio carrier in the system mentioned above where the carrier is of the order of 1000 megacycles, an oscillator accurate to one part in $10^6$ could be expected to depart from its theoretical or nominal frequency by 1000 cycles and the demodulating oscillator might depart from the same nominal frequency in the opposite direction. The resultant 2000 cycles error would be carried down to the voice frequency band and the resulting signals would be unusable.

This difficulty is further accentuated in radio relay and in certain forms of wire carrier systems. In radio relay systems it is necessary, to prevent the outgoing wave from feeding back into the receiver, to change the frequency of the outgoing wave with respect to the incoming one. This is again done by the heterodyning or modulation process. In wire carrier systems, because of the different transmission characteristics of wire or cable with respect to different frequencies, there are great advantages to be gained by "frogging" the various channels; i. e., inverting the frequency of the band as a whole or by groups so that all frequencies in turn occupy like portions of the band and are subject to like attenuations. Among other advantages this reduces the necessity for equalization at each repeater or terminal point but it also results in many more modulators, the frequency errors whereof appear in the final voice channel. For such reason it has been customary, where radio relay has been used in connection with amplitude modulated signals, to transmit the carrier as well as the signal information itself, in spite of the great savings which single sideband, suppressed carrier, modulation provides.

Consider, for example, a 24 channel cable carrier system such as is mentioned above. In this system the frequencies used for frogging are in the neighborhood of 300 kc. The circumstances under which this system is used usually require that at least a part, if not all, of the repeaters at which the frogging takes place are unattended and it is economically not feasible to use temperature controlled crystal oscillators, recourse being had to less stable types. Experience has shown that the probable frequency error in any one oscillator is in the neighborhood of 2 parts in $10^5$, or about 6 cycles per oscillator. Along the line there may be many repeater points, and while the departure of the various oscillators from their nominal frequencies is in the nature of a compensating error and it is therefore highly unlikely that the overall error will be the sum of the individual errors, due to the fact that the various oscillators may be operated under widely different conditions—some indoors, some outdoors and exposed to extremes of heat or cold—the possibility always exists that the errors may become completely additive. Hence, if in a system of the character described there were employed 16 repeater points, the probable deviation and hence the frequency distortion in the demodulated signals would be in the neighborhood of 25 cycles, but the possible error would be four times this or approximately 100 cycles. Even the 6 cycle deviation would be undesirable for a voice channel and impossible for a music channel. A 25 cycles deviation might give intelligible voice, although it would be badly distorted and usually not acceptable under current telephone practice. A 100 cycles deviation would be quite intolerable.

It is for the reasons outlined above that up to the present time double sideband modulation, with transmitter carrier, has been employed in wire or cable carrier systems where frogging is used, in spite of the fact that a single sideband system permits the transmission of double the number of simultaneous messages at the same power and with better signal-to-noise ratio, disregarding, for the moment other noise reducing methods which frogging may make possible. Radio relay systems generally employ modulation methods even more extravagant in their use of band width, the difficulty of obtaining carrier oscillators of sufficient accuracy for the single-sideband, amplitude modulated system overriding the advantages of such a system.

The broad object of the present invention is to provide a means of restoring exactly to their nominal values the signals in a band of frequencies, whether it be a single channel, a subgroup, group, or super group, which, because of their having undergone one or more modulations with accompanying frequency shifts, depart from their nominal values by an equal number of cycles. The ultimate objects of the invention therefore include the provision of means and methods for so controlling the frequencies in a band as to make feasible single sideband transmission in a carrier system wherein the frogging technique is employed; to provide means and methods of demodulating single sideband signals which is so accurate that this system of transmission may be economically used on high quality, low cost, circuits and yet provide channel fidelity adequate for the transmission of music as well as speech; to provide means and methods for modulating and demodulating broad band signals of the single sideband type which will enable such signals to be used on ultra high frequency radio-relay channels substantially without distortion; to provide means and methods for demodulating or frogging single sideband signals which are sufficiently simple and economical so that they may if desired, be employed at each relay point, with the result that even after repeated modulations and remodulations the frequency errors of all except the last are completely cancelled in spite of carrier frequency instability at the remodulating points, and so that the final signals as received at the terminal can be restored to their original frequency values to any desired degree of accuracy; to provide means and methods whereby, in a system wherein frequency shifting oscillators are used at one or more repeater or relay points, inexpensive and only relatively stable oscillators may be used at each such relay point and the cumulative errors corrected in a single process at a terminal where it is feasible to maintain a master oscillator of utmost stability; and, as a result of the characteristics mentioned, to provide means and methods of modulation and demodulation which permit single sideband modulation to be used where it was heretofore impractical, and to provide means and methods of doubling the channel capacity of a radio or wire carrier system without sacrificing quality, with improved signal-to-noise ratio, and at a cost which compares favorably with that of more conventional systems.

Considered broadly the method of this invention involves the addition to a band of signal waves, which have been or are about to be transposed in frequency by heterodyning or single sideband modulation, a pilot frequency of accurate, known value. The pilot frequency may be added at any desired step or frequency level in a system involving cascaded modulations; i. e., a pilot may be added to a subgroup, group, or super group, depending upon the degree of control desired, the stability of the pilot frequency oscillator and the maximum frequency which is to be used in the final transmission. The pilot frequency is allotted a channel of its own of a width sufficiently great to accommodate the maximum errors in frequency which are to be expected as a result of the repeated frequency transpositions to which the band is to be subjected. If the maximum carrier frequency employed in the system is of the order of 300 kc. the band allotted to the pilot may be only approximately 100 cycles wide and the pilot may be placed in the guard-band between two adjacent voice channels. If the signals are to be modulated on a radio carrier it will, by preference, be in a guard band between groups and its allotted band may be as wide or wider than a complete voice channel. Usually its location will be somewhere in the neighborhood of the upper or lower frequency of a group, super group, or band, although this is not a necessary feature, since the reason for this placement of the pilot is that such pilot frequencies are customarily employed for the purpose of automatic gain control, and for this purpose are so located; the pilot employed in connection with this invention can be used for this other purpose concurrently without affecting its utility for either purpose. Once injected, however, the pilot is subjected to all of the modulations and remodulations, frequency inversions, etc., which are undergone by the message signals. As a result, at the receiving point the signal to which the pilot corresponds will have a frequency which is greater or less than its nominal value by an error which is equal, in cycles-per-second, to that of all other frequencies in the band of which the pilot forms a part. Under certain circumstances to be described later, a second pilot, bearing a known frequency relationship to the first, may also be injected, but this is not an essential feature of the invention but rather a refinement. The level of the pilot signal is of the same order as the amplitude of the other signals in the band, and between the transmitting and the receiving points it is handled in precisely the same manner, as was indicated above.

At the receiving terminal the frequency band is divided into two portions, in separate circuits, by appropriate filters, one of these portions comprising the pilot only, the other comprising either the entire band (which is preferable) or the band exclusive of the pilot. If a second pilot be used it is also filtered out in the same manner in a third circuit. All portions of the original band now have frequencies which are approximately known but which depart from their nominal frequencies by some unknown error. One portion of the band is now remodulated with a locally developed frequency which will transpose its nominal frequency or frequencies to a value such that there is no common frequency in the two portions; i. e., so that the frequency which now represents the pilot signal lies outside of the band which now represents the original message signals. Technically it makes no difference which of the two portions of the band is thus transposed but in practice it is usually simpler to transpose the pilot rather than the band as a whole. The frequency used to accomplish this modulation in the case of a single pilot operation is an accurately controlled local oscillator. In the case where two pilots are used they are intermodulated in a third order modulator, i. e., one wherein the frequency developed and selected by the output filter is twice one of the pilot frequencies minus the other. There now exist in the system a band of frequencies each of which departs from its nominal value by the frequency error and a single frequency, lying outside the band, which also departs from nominal frequency by the same error. These two signals are intermodulated, resulting in two sidebands, in one of which, since they represent respectively the sum and the difference of the intermodulated components, the error is doubled, whereas in the other sideband the two errors cancel. It will be seen that if a locally generated oscillation were used to effect the next to the final modulation there will be a residual error representing the deviation of the local oscillation only, whereas if the double pilot system was used the cancellation of the error will be exact.

The frequency correction is usually accomplished at the same level as that at which the pilot was injected, but this is not necessarily the case. In a radio relay system correction may be made at each relay point, in which case the error at the receiving terminal will be merely the error of the final transmission at the last relay stage instead of the algebraic sum of the intervening errors. Where the final correction is made, however, the frequency is preferably stepped-down in one or more stages and the correction is made where super groups or groups are separated. It will be realized, however, that a frequency representing the same pilot that was used to correct a super group will still exist in one group and one subgroup and it may be used to correct the frequencies to still greater accuracy as the frequencies are stepped down, or, if separate level corrections are to be made in groups or subgroups, the operation can be repeated as desired, the residual error after the last correction leaving only that due to the frequency deviation between the lowest frequency modulating and demodulating oscillators. The final error in the speech channels may be reduced to a very small fraction of a cycle, whereas, in conventional systems, deviations of 2 or more cycles are tolerated even in high quality systems.

The detailed description of certain embodiments of the invention will make this clearer when taken in conjunction with the accompanying drawings wherein:

Fig. 1 is a simplified symbolic block diagram of a carrier-current system embodying the invention, means for forming subgroups, groups and super groups of frequencies being indicated, together with the intermediate frequency changing equipment and the frequency corrector with which this invention is particularly concerned. The demodulating equipment is omitted, as after the frequency correction the various groups and subgroups are separated by conventional equipment and all amplifiers are also omitted.

Figure 1:
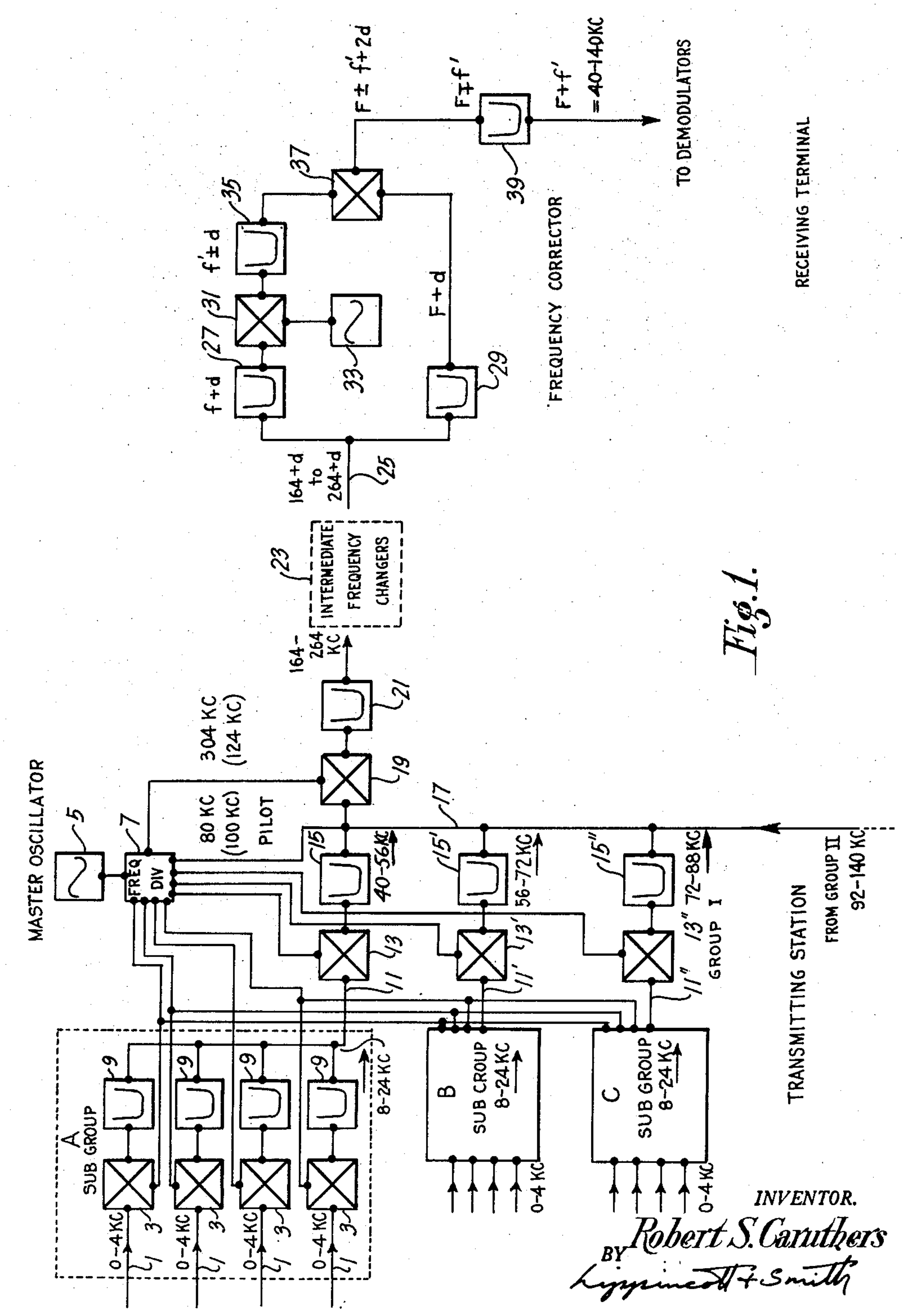

Considering first Fig. 1, the equipment symbolically indicated within the dotted rectangle indicated generally by the reference character A is that for forming a subgroup of frequencies in a band 16 kc. wide, these frequencies being derived from 4 speech-width channels. Each of these channels has a nominal band width of 4 kc., the actual speech frequencies occupying a somewhat narrower band, so as to provide guard bands between the frequencies which actually carry the messages and also to leave room for ringing and dialing sub-channels. Here, as in the remainder of this figure, the various amplifiers which would actually be used to bring the signals to the desired levels are omitted in order to simplify the figure. The four imput lines through which the signals are received are each designated by the reference character 1. Each input line connects to a conventional balanced modulator 3, where the signal frequencies are modulated upon carriers of different frequencies. Preferably all of the carrier frequencies are derived from a single master oscillator 5, of maximum frequency stability, i. e., one which is crystal controlled with the crystal maintained at constant temperature in a thermostatically regulated oven, so that the output frequency of the oscillator is maintained constant to one part in $10^6$ or better. In accordance with one conventional practice this oscillator operates at the highest frequency required in the particular terminal where it is located, and the various other frequencies used at this end of the system are derived from the output of the generator by a frequency divider 7, which may take any of a plurality of forms. Alternatively, of course, the oscillator can operate at a lower frequency and the various carriers, pilots, etc., used in the system may be derived by frequency multiplication. The frequency division method is preferred, however, because in practice greater frequency stability has been obtained by using this method.

The different requencies derived as above mentioned are fed to the respective modulators 3. The frequencies chosen for this purpose, may be, for example, 8, 12, 16 and 20 kc., in which case the output of the modulators is in each instance fed to a band pass filter 9 each of which is designed to pass a band one speech channel or 4 kc. wide, the pass bands of the respective filters being 8 to 12, 12 to 16, 16 to 20, and 20 to 24 kc., representing in each case the upper sideband resulting from this initial modulation. Alternatively the modulating frequencies supplied from the frequency divider may be 12, 16, 20 and 24 kc., in which case the same filters will pass the lower sideband resulting from the modulation. The outputs of the four bandpass filters are combined in a common circuit 11, which accordingly carries a band extending from 8 to 24 kc.

Precisely similar equipment is comprised in the block indicated by the reference character B, which delivers a like band of frequencies into the common circuit 11′ and also in the block indicated at C feeding into the common circuit 11″.

The circuits 11, 11′, and 11″ supply group modulators 13, 13′ and 13″ respectively where the similar bands of output frequencies are remodulated on different carriers, also derived from the master oscillator 5 and frequency divider 7. These carrier frequencies may, for example, be respectively 64, 80, and 96 kc., in which case the bandpass filters 15, 15′ and 15″ select the lower sideband, their outputs connecting to a common circuit 17, which accordingly carries a frequency band of from 40 to 88 kc. The frequencies derived from subgroups A, B and C can be termed those belonging to group I. Frequencies derived from a similar set of subgroup modulators and filters, but occupying the band from 92 to 140 kc. may be referred to as the frequencies of group II, and these are added to the frequencies of group I in the common circuit 17, to form a band of frequencies from 40 to 140 kc. constituting a "supergroup."

In the example shown a pilot frequency 80 kc. is added at this point, it being obvious that the 80 kc. pilot lies within the band of frequencies from group I. It may be noted alternatively the pilot frequency injected at this point could be 100 kc. lying within group II, which, as will be shown would give it the same frequency position within the band of a supergroup.

The supergroup is next passed through a modulator 19 where it is combined with a frequency of 304 kc. and passed through a band pass filter 21 which selects the resultant lower side bands to yield a frequency band of from 164 to 264 kc. Within this frequency band the pilot frequency of 80 kc. is now represented by a pilot frequency of 224 kc. The same frequency band can be obtained by using a carrier of 124 kc. in the modulator 19, in which case the bandpass filter 21 will select the upper sideband and a pilot frequency of 100 kc. will be represented by a frequency of 224 kc.

From this point on the signals can undergo as many frequency changes as may be desired, either through remodulation of the supergroups into super-supergroups or, if transmitted over a cable, for example, the frequency band may be inverted in whole or in part to accomplish the purpose of frogging. Such operations are represented by the dotted rectangle 23, bearing the legend "intermediate frequency changes." It will be assumed that so far as the supergroup here considered in detail is concerned the entire band which it represents is subjected to the same series of frequency changes, and that in each of its changes it is modulated upon a carrier the nominal frequency whereof is subject to some unknown error. Thus in a two-way cable system the signals may be repeatedly modulated and remodulated on carriers having nominal frequencies of 304 kc., selecting the lower sideband and thus inverting the band—frogging—in each case. The E–W band of 164–264 kc. thus is converted to 40–140 kc. at the first repeater, where the W–E band is also inverted to the same range for transmission to the E terminal. It is assumed here that after a number of such inversions the band here treated in detail will appear in the input circuit 25 at the receiving terminal as a band of frequencies covering the range from 164 kc.$+d$ to 264 kc. $+d$, where $d$ is an error of a constant number of cycles and may be either a positive or a negative quantity. It is the algebraic sum of the deviations from 304 kc. of the carrier frequency oscillators at the various repeaters. In the output of the channel 25 the band of frequencies is separated into two portions or circuits. Each of these circuits includes a bandpass filter, one having a pass band of from 164 kc.$-D$ to 264 kc.$+D$, were D represents the largest positive frequency deviation from the nominal value of the frequency band to be expected. The other circuit contains only the pilot frequency of 224 kc.$+d$ being passed by a second band-pass filter, the pass band whereof accepts frequencies of $224\pm D$.

The nominal frequency or frequency band $f$ in the upper branch of the circuit, is passed by the filter 27 while that in the lower branch, passed by filter 29, is designated as F. For the moment it makes no difference whether $f$ or F represents the wide band or the single pilot frequency. In either case there will be added, algebraically, the frequency error $d$. The frequency or frequencies passed by filter 27 are fed into a modulator 31 where they are mixed with a locally derived carrier frequency from a source 33. In general it is entirely adequate if this source be a master oscillator of the same character as the master oscillator 5, but it must be noted that in case the double pilot system referred to above used, the source may be the second pilot in the signal itself, operated upon as will later be described. In any event the frequency supplied from the source 33 will, in the system here now considered, be either 80 or 100 kc., depending upon which was the original frequency of the pilot supplied to the common circuit 17. A filter 35 in the output of the modulator 31 selects one sideband, which will be designated as "$f'\pm d$." This sideband is fed to a modulator 37.

The second circuit feeding modulator 37 is the output of filter 29. The resultant sidebands can be expressed as $F\pm f'+2d$ and $F+f'$. In one of these sidebands it will be noted the error is doubled while in the other sideband the error in the band and the pilot signal cancels out. Filter 39 selects the sideband wherein the error is zero and passes a band of from 40 to 140 kc. which corresponds precisely to the frequency band in the circuit 17 where the pilot was added. There will be a residual error due to the discrepancy in frequencies between the original pilot derived from the master oscillator 7 and the frequency supplied by the oscillator 33. Assuming in each case the nominal frequency was 80 kc., and that the local oscillators at both terminals of the system are stable to one part in one million, the maximum frequency deviation between the two 80 kc. frequencies will be 2 parts in one million which, at the 80 kc. frequency, amounts to 0.16 of a cycle. One half of this probable error is due to the deviation of the receiving end oscillator from its assigned value. The remainder is due to the deviation in frequency of the master oscillator 5. If the 100 cycle pilot was the one first injected the probable deviation in the 40 to 140 kc. band fed to the demodulators would be 25% greater or $^2/_{10}$ of a cycle per second.

Either of these errors is too small to be of any moment whatsoever in any ordinary telephone circuit. If, however, for any reason a more accurate control is believed necessary a pilot could be added to one of the groups or subgroups and the process repeated. If, for example, a pilot were added in each of the common circuits 11, 11' and 11'' the deviation would be cut to less than half and if it were added to the subgroups and the process there repeated the error would be cut to the order of 0.04 cycle. Since the demodulating frequencies would preferably be selected from the same source as that supplying or indicated by the source 33, by proper choice of the demodulating frequency the ultimate error can be made merely that due to the deviation of the highest modulating frequency in the subgroup in the transmitting end, although this final step is not necessarily a portion of this invention.

In the discussion of the frequency corrector given above the question was left open as to which of the two branches of the circuit 25 carried the entire band and which carried the pilot frequency only. From a theoretical point of view this makes no difference at all, but as a practical matter it is usually a little simpler to operate on the pilot than on the broader band. In this case F would represent the band of frequencies from 164 kc.$+d$ to 264 kc.$+d$, while $f$ represents the pilot frequency of 224 kc.$+d$. We have assumed a symmetrical system, wherein the output band from the frequency corrector is the same as the input band to the modulator 19 and it is to be remembered that whether the pilot frequency chosen were 80 kc., and the carrier supplied to modulator 19 were 304 kc. or the pilot and carrier frequencies were 100 kc. and 124 kc., respectively, the pilot occupies the same position in the band at 224 kc. In the former case relative positions of the frequencies representing individual input frequencies will be direct whereas in the other case these frequencies will be inverted with regard to their positions in the band. The errors that can be corrected are only those due to modulations which succeed the injection of the pilot, and as far as the frequencies appearing in the circuit 25 are concerned it makes no difference whether the band was inverted or not in the various modulations undergone by it between the pilot injection and the final restoration of the original frequency band. The frequency correction can be accomplished in such manner that a band of frequencies comprising the output supergroup are either in direct or inverted relationship, which is purely a matter of choice. The necessary criterion with regard to the modulating frequency injected from the source 33 is that the resulting sideband shall be so displaced there shall be no common frequency fed to the modulator 37 from the two circuit branches which feed it.

In a system of this nature as actually constructed the frequency fed from the local source 31 is 80 kc., and, as indicated above, it is heterodyned with a 224 kc.$+d$ pilot frequency. The filter 35 selects the upper sideband, whose frequency is 304 kc.$+d$. In the modulator this is mixed with the band passed by the filter 29 of 164 kc.$+d$ to 264 kc.$+d$. The lower sideband in the output of the modulator 37 is then the difference between the 304 kc.$+d$ frequency and the frequencies lying between 164 kc.$+d$ and 264 kc.$+d$. The error frequency $d$ is therefore combined subtractively in this sideband so that the output frequency of the filter 39 is the band from 40 to 140 kc., with the frequencies inverted with respect to their relative positions in the circuit 25.

The same band of frequencies, but uninverted, can be secured by injecting a 100 cycle carrier from the source 33 to the modulator 31. In this case the filter 35 would select the lower sideband resulting from the modulation of the 224 kc.$+d$ pilot frequency, it again being noted that this is outside of the 164 to 264 kc. band. The band and the shifted pilot are intermodulated in the modulator 37, and the difference frequency is again the band-plus-the-error minus the pilot-plus-the-error, with a cancellation of the error in the lower sideband of 40 to 140 ks., but this time the band is uninverted.

Precisely the same results are obtainable if it be the band which is modulated by the frequency from the source 33, and the frequency supplied by the source is the same as before, i. e., either 80 or 100 kc., it again being noted that these frequencies lie outside the band itself. It is the opposite sidebands which are chosen, however, in the two cases, i. e., if the 80 kc. frequency be chosen it is the upper sideband which is selected by the filter 35, resulting in a shifted band of from 84 to 184 kc. This combines with the original 224 kc. pilot, and the lower sideband, selected by filter 39, is again the difference frequency of 40 to 140 kc. with the band inverted. If the 100 kc. frequency is used to modulate the band the upper sideband, nominally 264 to 364 kc., is chosen in the filter 35 and the 224 kc. pilot is subtracted in the intermodulation yielding an uninverted band of 40–140 kc. with the errors cancelling.

It will be noted in the examples given that there are four variants which yield the same sidebands as far as total frequencies included are concerned, two of these variants yielding erect sidebands and two inverted. In both cases it is the lower sideband which is chosen from the products of the final modulation. This is because the frequency injected from the source 33, whether it be 80 or 100 kc., is the lowest frequency involved in the inter-modulation occurring in modulator 31, and it is this frequency therefore that is either added to or subtracted from the frequencies supplied from the filter 27, the error being uninverted in either case. In the usual case where correction is applied immediately prior to demodulation with a consequent general stepping down of frequencies it is advisable that the locally generated frequency be as low as possible so that the percentage error here injected, when expressed in cycles, shall be as small as possible. Under certain circumstances, however it may be desirable to make the locally added frequency the highest of those intermodulated in the modulator 31. Under these circumstances the error appears in opposite senses in the upper and lower sidebands developed by this modulator. Therefore, when the two channels are combined in the modulator 37 the errors cancel only if the opposite sideband be chosen from that selected by the filter 35; i. e., if the upper sideband be selected by filter 35 the lower sideband must be selected by the filter 39 and vise versa. Again there are four variants which yield substantially the same results in the output of filter 39 when the modulating frequency from the source 33 is the highest of those combined. Two, yielding respectively erect and inverted sidebands when the band as a whole is shifted in frequency and two more, also yielding respectively erect and inverted sidebands when it is the pilot frequency which is shifted.

Figures 2, 3:
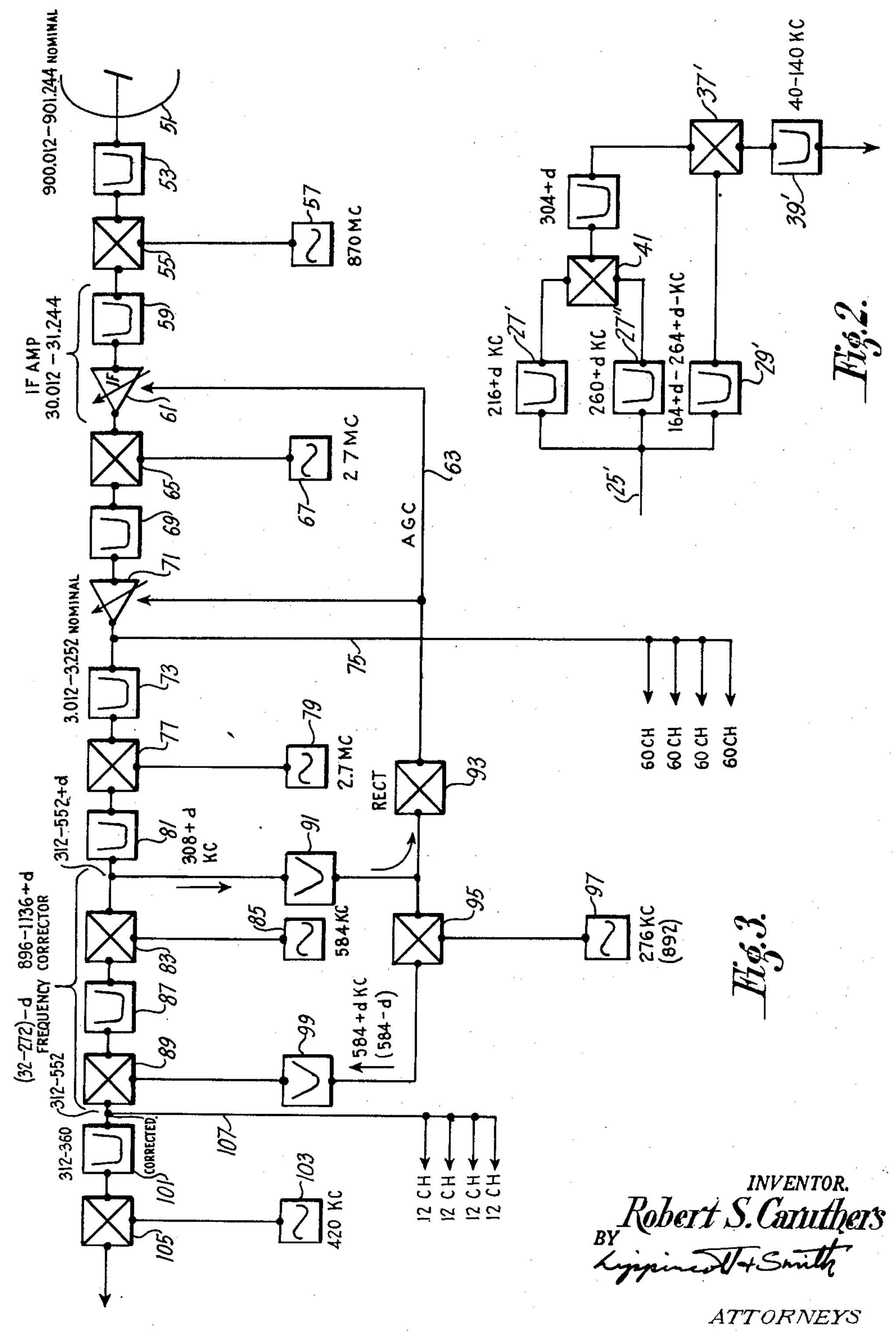
Fig. 2 is a symbolic block diagram showing one modification of a frequency corrector using 2 pilot frequencies, which may be substituted for that portion of the system of Fig. 1.
Fig. 3 is a symbolic block diagram of a radio-relay receiving terminal embodying another modification of the invention, the necessary amplifiers being shown in their proper position in the circuits.

Fig. 2 shows an arrangement whereby the generation of a local frequency can be wholly avoided, the function of the oscillator 33 being supplied by a frequency derived from the band itself, and the error, at the level at which the correction is applied, reduced to that inherent in the local oscillator at the transmitting terminal. The system is the same except that two pilots are introduced prior to modulation by the supergroup modulator 19. These pilots may be, for example, 44 and 88 kc. respectively which, upon modulation by the modulator 19, become (the lower sideband being chosen and the modulating frequency 304 kc.) 260 and 216 kc. respectively. The circuit 25′, corresponding to the circuit 25 in Fig. 1, is in this case divided into three branches, each with its band-pass filter to select one portion of the signal band. In this case the filter 29′ selects the entire band, while filters 27′ and 27″ select the 216 and 260 (nominal frequency) pilots respectively. The two pilot frequencies are combined in a third order modulator 41. Among the sidebands developed by the modulator is one comprising the frequency $2F_1-F_2$. If we take $F_1$ as the $260+d$ pilot and $F_2$ as the $216+d$ pilot the resulting sideband is $2(160+d)-(216+d)=304+d$. This is the original carrier supplied to modulator 19 plus the error, and is intermodulated with the band in modulator 37′. The filter 39′ selecting the lower sideband, gives the band 40–140 kc. as before. At this point the only residual error left is due the possible departure of the pilots from their norm which appears as error in the difference between the two pilot frequencies, which is 44 kc. Taking the assumed stability of the master oscillator as one part in a million the total error is 0.44 cycle. As in the previous case the process can be repeated at a lower frequency level and the error reduced to any desired minimum limit.

As has already been indicated the diagrams of Figs. 1 and 2 are simplified by the omission of all amplifiers and other elements not directly connected with the theoretical consideration of the invention per se. Fig. 3 is a symbolic diagram of a frequency corrector circuit as actually used in the radio relay system, showing the amplifiers and other associated apparatus. For the sake of convenience certain of the filters have been altered in position from those shown in Figs. 1 and 2, but it will be seen upon consideration that the frequencies in the various branches of the circuit which feed the modulators are not affected by such shifts and the principles of operation are identical to those which have been already described.

The equipment symbolized in Fig. 3 is the receiving end of a radio relay system wherein five 60-channel supergroups, each single sideband modulated, are in turn modulated upon a single ultra high frequency and occupy a band nominally extending from 900.012 to 901.244 mc. As has already been explained the various modulators used in stepping up the frequencies within the band may depart from their nominal values by one part in a million. Since these departures are random in nature it is possible that they may be in opposite directions. All of the carrier frequencies involved at each end of the system are preferably derived from a single master oscillator at that terminal, and hence the errors will all be proportional to the frequency. In reestablishing the original message frequencies the important point is not the departure of the modulating and demodulating frequencies from their nominal values but the actual difference between the two frequencies. In the discussion which follows it will therefore involve no error if it be assumed that the modulating frequencies are exactly those intended, while the demodulating frequencies depart from the nominal values by twice the maximum error to be expected from either oscillator. The system will be described assuming the maximum frequency errors at each step, thus illustrating both the magnitude of the corrections which may be necessary and the precision of the corrections actually achieved. The probable residual errors, under the assumptions made, would be smaller than those postulated.

Turning now to Fig. 3, the signals are received on a microwave antenna 51 and the band from 900.012 to 901.244 is selected by the usual band-pass tuning equipment 53 embodied in the receiver. They are heterodyned down to an intermediate frequency in a mixer tube or other type of modulator 55 by a "local oscillator" 57, indicated in this drawing, for the sake of simplicity, as being an individual source but actually preferably derived from the master oscillator. This is indicated as operating at a frequency of 870 mc. and since the entire frequency error of both modulating and demodulating oscillators is assumed to be allotted to the local source, the departure from its nominal frequency is assumed to be two cycles per megacycle or 1740 cycles. This departure, of course, may be either positive or negative. Assuming it to be positive, its actual frequency is 870,001,740 cycles. A band-pass filter 59 selects the lower sideband, the nominal frequencies whereof are 30.012 to 31.244 mc., but the actual frequencies whereof are each lower than the nominal frequency by 1740 cycles.

This band of frequencies is amplified by an I. F. amplifier 61, which is provided with an automatic gain control, the control voltage being derived from a circuit 63 as will later be described. From the I. F. amplifier the signals are passed to a second demodulator 65, where they are mixed with a 27 mc. carrier, shown as comprising a local source 67, but again preferably derived from the master oscillator and therefore, under the assumption already stated, deviating from the nominal 27 mc. frequency by plus two cycles per million or 54 cycles. A band-pass filter 69 selects its lower sidebands covering a nominal frequency range from 3.012 to 4.244 mc. but actually the 1794 cycles lower than this, since the 54 cycle frequency of the oscillator 67 is also subtracted.

This lower band is again amplified in an automatic-gain-controlled amplifier 71 which also is supplied with its control potentials from the circuit 63. From the amplifier 71 the signals are fed to a group of band-pass filters which select the individual 60-channel bands. Of these, only one is shown, that passing the nominal band from 3.012 to 3.252 mc. Similar band-pass filters, selecting, respectively, the other four 60-channel supergroups, are connected to a circuit 75. Since the signals in each of these groups are handled in precisely the same manner as those in the channel shown there is no necessity for discussing them individually.

From the filter 73 a selected band is passed to a demodulator 77 supplied with its carrier frequency from the master oscillator but indicated as a local source 79, nominally operating at a frequency of 2.7 mc. but under assumptions already discussed actually operating at a frequency of 5.4 cycles higher than this value. A band-pass filter 81 again selects the lower sideband, nominally from 312 to 552 kc. but actually 1799.4 cycles lower since the error is again introduced subtractively.

It is at this point that the frequency correcting equipment is introduced into the circuit. Under the assumptions made the actual band of frequencies supplied to the corrector is from 310,200.6 cycles to 550,200.6 cycles. The pilot frequency is included within this band, its nominal frequency, in this case, being 308 kc. and its actual frequency being 306,200.6 cycles. The circuit here separates into two branches, designated, for convenience, as the "main circuit" and the "branch circuit." In this particular instance it is desirable, for the purpose of standardization of the equipment to follow, that the actual output band of the frequency corrector should be the same as its nominal input band. Therefore, since the frequencies in the band will be shifted by the correction, the band is first shifted in frequency to a nominal value of 896 to 1136 kc. by means of a modulator 83 supplied by local source 85. Again assuming that this source is derived from the master oscillator by frequency division, the frequency assigned to it is 584 kc., and it is actually 1.168 cycles high. The associated filter 87 selects the upper sideband, which reduces the frequency error in all of the frequencies of the output band by this amount of 1.168 cycles. The band is then fed to a correcting modulator 89.

The branch circuit leads first to a band-pass filter 91 which selects the pilot frequency, which in this example has a nominal frequency of 308 kc. The pass band of the filter 91 is wide enough to accept any frequency departing from the 308 kc. nominal frequency by the maximum error to be expected; in this case $\pm 1000$ cycles approximately (this being the only point in the discussion where the allotment of the entire error to the local oscillator has any effect upon the final outcome). In actual practice, of course, it would be well to allow some latitude, allotting an entire voice channel at this point to the pilot frequency in order to permit a deviation of $\pm 2$ kc. instead of $\pm 1$, but this is a detail not important to the invention.

At the output of the filter 91 the circuit again divides. One branch leads to a rectifier 93, to provide a D. C. output voltage which varies as the amplitude of the pilot and is supplied to the circuit 63 to control the gain of amplifiers 61 and 71, the pilot thus exercising a double function. The other branch leads to a modulator 95, supplied as before with a locally generated frequency, here of 276 kc., the master oscillator source being indicated at 97. The assumed frequency error in this oscillator is .552 cycle. The actual frequency of the nominally 308 kc. carrier is 306,200.6 cycles. The resultant upper sideband, which is selected by a band-pass filter 99, is nominally the 584 kc. value, the same as that supplied by the oscillator 85. It is actually less than this value by the 1799.4 error common to all of the frequencies in the band, minus the error of 0.552 cycle of the local source 97. This is supplied to the modulator 89 as a carrier.

In the lower sideband produced by intermodulation of this last carrier on the band of frequencies, the carrier is subtracted from each frequency in the band. Up to the points of modulation on the carriers supplied by the sources 85 and 97, the discrepancies in all of the frequencies was all the same, and this portion of the error therefore cancels out in the lower sideband of the intermodulation products produced by the modulator 89; in the upper sideband the errors would be additive, but the upper sideband is in each case discarded and the lower sideband selected. Of the errors in the frequencies from the sources 85 and 97, these appear subtractively in the selected band of the output of the modulator. The error introduced by the source 85 was 1.168 cycles. The error of .552 cycle in the output of source 97 is subtracted from this, leaving a residual error of 0.616 cycle.

As has already been pointed out, even very high quality speech and music channels for broadcast purposes are permitted a deviation of 2 cycles. The correction applied at this point is therefore ample for all ordinary purposes, but the process may be repeated in the twelve-channel groups if desired, reducing the deviation to as low a value as may be desired.

In the system described the 12-channel groups are separated in the output of the frequency corrector. Of the 312 to 552 kc. lower sideband in the output of modulator 89, a filter 101 selects a group 48 kc. wide extending from 312 to 360 kc., and this is demodulated upon a 420 kc. carrier, from a source 103, in a modulator 105. The resultant lower sideband, comprising frequencies from 60 to 108 kc. (in this particular channel) is selected by the output filter (not shown). Assuming the error in the frequency developed by the source 103 to be 0.84 cycle, this is subtracted from the additive error of 0.616 cycle leaving a resultant error of only 0.224 cycle, still further reducing the overall error.

A branch circuit 107, taking off from the output of modulator 89 ahead of the filter 101, supplies other 12-channel groups of the same character as that supplied to the group considered specifically by the filter 101.

It should be apparent that it is possible to use different modulating frequencies in the corrector from those assumed above, and still achieve exactly the same result. The filter 87 in one case selects the lower sideband, giving a nominal frequency band of from 32 to 272 kc. Since the negative frequency error is subtracted in this case, it appears as a positive frequency error in the output of filter 87. The residual error in the 584 kc. carrier also appears additively. The carrier frequency added to the nominal 308 kc. pilot is in this case 892 kc. Filter 99 selects the same band as before, nominally 584 kc., and again the negative frequency error existing in the input of the corrector is subtracted, giving a positive frequency error in the output. The filter 89 selects the lower side band of 312 to 352 kc., where the errors, up to those introduced by the frequencies from the elements 85 and 87, cancel. The residual error is proportional to the difference in frequency between sources 85 and 97, and as the difference in the two frequencies is the same as before the residual error comes out as .616 cycle as before.

It is not even necessary that the intermodulating frequency passed by the filter 99 be the same as that from the source 85; a local frequency of 28 kc. supplied as a carrier to the modulator 95 will give a lower sideband of nominal frequency of 280 kc. Combined with the lower sideband from modulator 83, the upper sideband of 312–552 from the modulator 89 will be the one wherein the errors are cancelled. The residual error will be slightly larger, however, although still too small to be of any practical importance.

The above is based on the assumption that the intermediate steps of modulation and demodulation are carried out using carriers of the same nominal frequency at transmitter and receiver and that the steps occur in the same order, utilizing the same corresponding sidebands. This procedure leads to minimum discrepancies, but with the correction system here disclosed it is not necessary. Neither is it necessary that the demodulating frequencies supplied from the sources 57, 67, 79, 85 and 97 be derived from the same source, although minimum ultimate error will be involved if the last two at least are so derived. So long as the algebraic sum of the discrepancies does not exceed the band width of the pilot filter the corrector will eliminate all deviations which occur ahead of it in the transmission channel. It therefore is possible not only to use individual sources for the various intermediate carriers, but also to invert sidebands or to remodulate in different orders at will, so long as the pilot undergoes the same modulation and demodulation processes as the remainder of the band. If, instead of using the separate sources 85 and 97, an arrangement comparable to that shown in Fig. 2 be used, the frequencies delivered to the filter 101 will be identical with those existing in the corresponding band at the transmitter, and from this point onward the only errors introduced are those introduced by the succeeding demodulating frequencies, which are of relatively small value. These errors will be the resultant of the deviations of the oscillators used in the stepping-down process between 312 to 360 kc. and the ultimate frequency bands of the individual speech channels. The probable error will still usually be less than one cycle although it may vary in value depending upon the choice of sidebands in the demodulating process.

It will be understood that all of the specific frequency values that have been cited in this specification are illustrative only, and are intended merely to show the order of the maximum frequency errors which would develop in a system of the character described, using oscillators of the prescribed stability. Where more or less stable oscillators are used the maximum residual errors will vary proportionally, the probable errors being, of course, smaller.

In many cases it will be possible to apply the correction at the ultimate receiving terminal only. At this point the frequencies are stepped down by successive demodulations. If the demodulating carrier frequencies are properly chosen, and all are derived from a common source by frequency mutiplication or division, as is preferred, the ultimate error at the final "voice channel" frequency may be made to be merely that due to the frequency deviation between the carrier on which the original voice messages were modulated and the final demodulating carrier of the same nominal frequency. To accomplish this the demodulating frequencies used subsequently to the final correction should be so chosen that they are in each case effectively subtracted from the frequencies to be demodulated, which implies the choice of the lower sideband in each instance.

Since the residual erors will be small even if this final precaution is not adopted it may be that other considerations will make it desirable to use some order of demodulation which does not permit the lower sideband to be chosen in each instance; e. g., the alternative frequencies shown in brackets in Fig. 3 lead to the choice of the upper sideband in the filter 101.

It has been shown that there are four variants which may be used to develop any corrected frequency band with a given pilot frequency. Two of these variants utilize a lower frequency than that of the pilot to so shift it (or the band) that the frequency used for the final intermodulation lies outside of the band limits, the other two use a higher frequency than the pilot to accomplish the same result. The rule is that if the locally-generated frequency be lower than the frequencies on which it operates the lower sideband must always be chosen from the intermodulation products; if the locally-generated frequency be higher than those it operates upon opposite sidebands must be chosen from the initial frequency-shifting and intermodulating stages.

While the four variants mentioned lead to theoretically identical results as far as the primary sidebands are concerned, they may not be equally desirable in a practical system because of the possibility of higher order modulation products appearing within the desired message band. This will not occur if, in the initial modulations, the carrier frequency lies above the band to be modulated upon it but may occur if the carrier lies below the band. Thus in the case of the alternative frequencies discussed in connection with Fig. 1, where a carrier of 124 kc. is indicated as supplied to modulator 19, the third-order sideband of double-carrier-minus-message frequencies extends from 108 to 208 kc., which overlaps the desired 164 to 264 kc. band. The third order band will be materially below the desired band in level, but it would appear as cross-talk in the channels where overlap occurs. Good telephone practice would therefore dictate that this alternative frequency combination be not chosen where voice is to be transmitted, even though it might, in many cases, give acceptable results. Telegraph and television signals, however, will tolerate lower signal-to-noise ratios. Where the latter types of signals are to be transmitted or where the position of the pilot with respect to the message bands is such that no overlap between the primary and higher-order sidebands will occur, the use of the lower frequency carrier may have advantages.

It should also be apparent that in the system of Fig. 3 the positions in the circuit of the modulator 83 and the intermodulator 89 can be transposed without in any wise affecting the operation of the circuit. The frequencies used to obtain the same utlimate band from which the frequencies fed to demodulator 105 are selected will be identical in either case. Moreover, there is wide freedom of choice as to both the pilot and the locally introduced frequencies. All that is necessary is that either their sum or their difference must be such as to produce a carrier of the nominal frequency required for demodulation in the intermodulator.

For these reasons neither the frequencies which have herein been referred nor the order of the various modulators and filters shown are to be considered as limiting, all intended limitations being set forth in the following claims.

What is claimed is as follows:

1. Frequency changing apparatus for shifting to substantially exact individual frequencies a band of electrical waves including a pilot frequency wave, the frequencies whereof have been shifted from their nominal values by a relatively small unkown error, which comprises means including a filter for separating said band into two portions one of which comprises said pilot frequency wave only and the other of which comprises the remainder of said waves, means for modulating one of said portions onto a carrier of known stabilized frequency sufficiently high so that at least one resultant sideband of the modulated portion contains no frequency component common to the other portion, a filter for selecting said resultant sideband, a second modulator connected to intermodulate said resultant sideband and said other portion, and a band-pass filter for selecting the sideband produced by such intermodulation wherein the frequency errors are combined in opposite sense to produce substantial cancellation thereof.

2. Frequency control apparatus for a multichannel single-sideband carrier communication system the component signals whereof include a pilot frequency signal and have been shifted from their nominal frequencies by an error of an unkown and equal number of cycles per second, which comprises a main circuit for carrying all of said signals, a branch circuit derived from said main circuit, a filter in said branch circuit for selecting the pilot frequency component from said signals, a modulator in one of said circuits, an oscillator connected to supply a carrier frequency to said modulator of a frequency such that one resultant sideband will contain no frequency common to the other branch of said circuit, a filter for selecting said resultant sideband from the modulation products from said modulator, a second modulator connecting said main and branch circuits for intermodulating the signals carried thereby, and a band-pass filter connected to said second modulator for selecting the single sideband from the frequencies developed thereby wherein the frequency errors are combined in opposite sense to produce substantial cancellation thereof.

3. Apparatus as defined in claim 2 wherein said first mentioned modulator is in said branch circuit.

4. Apparatus as defined in claim 2 wherein said first mentioned modulator is in said main circuit.

5. Apparatus as defined in claim 2 wherein said filter for selecting said resultant sideband and said last mentioned filter are adapted to select opposite sidebands.

6. Apparatus as defined in claim 2 wherein the frequency of said oscillator is the lowest frequency supplied to said first mentioned modulator and said last mentioned filter is adapted to select the lower sideband from the frequencies developed by said second modulator.

7. The method of restoring to known substantially exact frequencies a band of message signals the frequencies whereof have been shifted by modulation on a carrier whose frequency differs from its nominal value by an unknown error, which comprises the steps of including a pilot signal of known frequency value in said band prior to said modulation, filtering said band to separate said band into two portions, one comprising said pilot frequency only and the other comprising the remaining frequencies of said band, modulating one of said portions onto a locally derived carrier of substantially exact frequency to shift the relative frequencies of said pilot and said band so that the pilot frequency signal is of a value outside of the range of frequencies comprising said band, intermodulating the signals representing said pilot and said band to develop two sidebands whereof one departs from its nominal frequencies by twice said unknown error and in the other whereof the frequency errors in the two intermodulated signals are combined in opposite senses so as substantially to cancel such errors, and filtering out said first mentioned sideband to leave a band of signals whose frequencies have been restored to substantially their exact nominal values.

8. The method of deriving message signals of substantially exact known frequencies from a band of signals the frequencies whereof differ from their nominal values by an error of an unknown number of cycles which comprises the steps of filtering from said band a single frequency of known nominal value to divide said band into two portions one comprising a single frequency and the other the remaining frequencies of said band, modulating one of said portions with a known frequency such that one of the resulting sideband frequencies contains no frequency component comprised within the other of said portions, intermodulating said resulting sideband and said other portion, and selecting from the products of such intermodulation the sideband wherein said error is cancelled.

9. The method as defined in claim 8 wherein said known frequency is lower than any of the frequencies within said band.

10. The method of deriving message signals of substantially exact known frequencies from a band of signals the frequencies whereof differ from their nominal values by an error of an unknown number of cycles which comprises the steps of filtering from said band a single frequency of known nominal value to divide said band into two portions one comprising a single frequency and the other the remaining frequencies of said band, modulating said single frequency on a known frequency such that one of the resulting sideband frequencies lies outside of the limits of said band, intermodulating said resulting sideband and said band of frequencies, and selecting from the products of said intermodulation a sideband wherein said error is cancelled.

11. In a single sideband carrier communication system wherein the signals are subjected to successive frequency changes between the transmitting and receiving terminals, the method of minimizing the effect of frequency discrepancies between the modulating and demodulating carriers which comprises the steps of adding to said signals a pilot signal of known frequency, stepping up the frequencies of all of said signals by modulation on a carrier of known nominal frequency, transmitting said signals, filtering from said signals the frequency corresponding to the stepped-up frequency of said pilot signal thus dividing said signals into two portions, modulating one of the portions with a known frequency to obtain resulting sideband frequencies in which the frequency components of the other portions are absent, intermodulating the so-produced sideband frequencies with the other portion and then selecting from the intermodulation products that sideband wherein the error is cancelled.

12. Apparatus for changing to substantially exact frequencies a band of electrical signals whose frequencies have been shifted by modulation upon a carrier frequency which differs from its nominal value by an unknown error, said band including at least one pilot signal of known frequency prior to said modulation and frequency shift, comprising a filter connected to separate said pilot signal from said band, means for developing a carrier frequency wave, a modulator connected to modulate said pilot frequency onto said carrier wave to produce a sideband of a known nominal frequency lying without said band and differing from said nominal frequency by said unknown error, a filter connected to said modulator and adapted to select said sideband from other modulation products produced thereby, a second modulator connected to intermodulate said band and said sideband, and a band-pass filter connected to said second modulator and adapted to select from the modulation products produced thereby a sideband wherein the unknown frequency errors of said band and said first mentioned sideband are combined subtractively to produce substantial cancellation thereof.

13. Apparatus as defined in claim 12 wherein said means for developing said carrier frequency wave comprises a local oscillator of known stabilized frequency.

14. Apparatus as defined in claim 12 for changing to substantially exact frequencies a band of electrical signals including a second pilot signal wherein said means for developing said carrier frequency wave comprises a filter for selecting said second pilot from said band.

15. The method of recovering accurate signal frequencies, including a pilot frequency, modulated as a single sideband on a carrier which deviates from its nominal frequency by an unknown small percentage, which comprises the steps of separating from said signals that representing the carrier modulated by said pilot frequency only, thus dividing the modulated signal into two parts, developing a local oscillation and remodulating one of said parts thereon, the frequency of said oscillation differing from any frequency comprised within the limits of the part so remodulated, intermodulating the remodulated part with the other part of said signal, and selecting from the modulation products of the intermodulated signals the sideband wherein the terms representative of said carrier frequency are combined subtractively.

References Cited in the file of this patent

UNITED STATES PATENTS

| | | |
|---|---|---|
| 2,007,416 | Affel | July 9, 1935 |
| 2,289,041 | Van Roberts | July 4, 1942 |
| 2,550,198 | Marzin | Apr. 24, 1951 |

OTHER REFERENCES

Journal A. I. E. E., Apr. 1921, page 314.